UNITED STATES PATENT OFFICE.

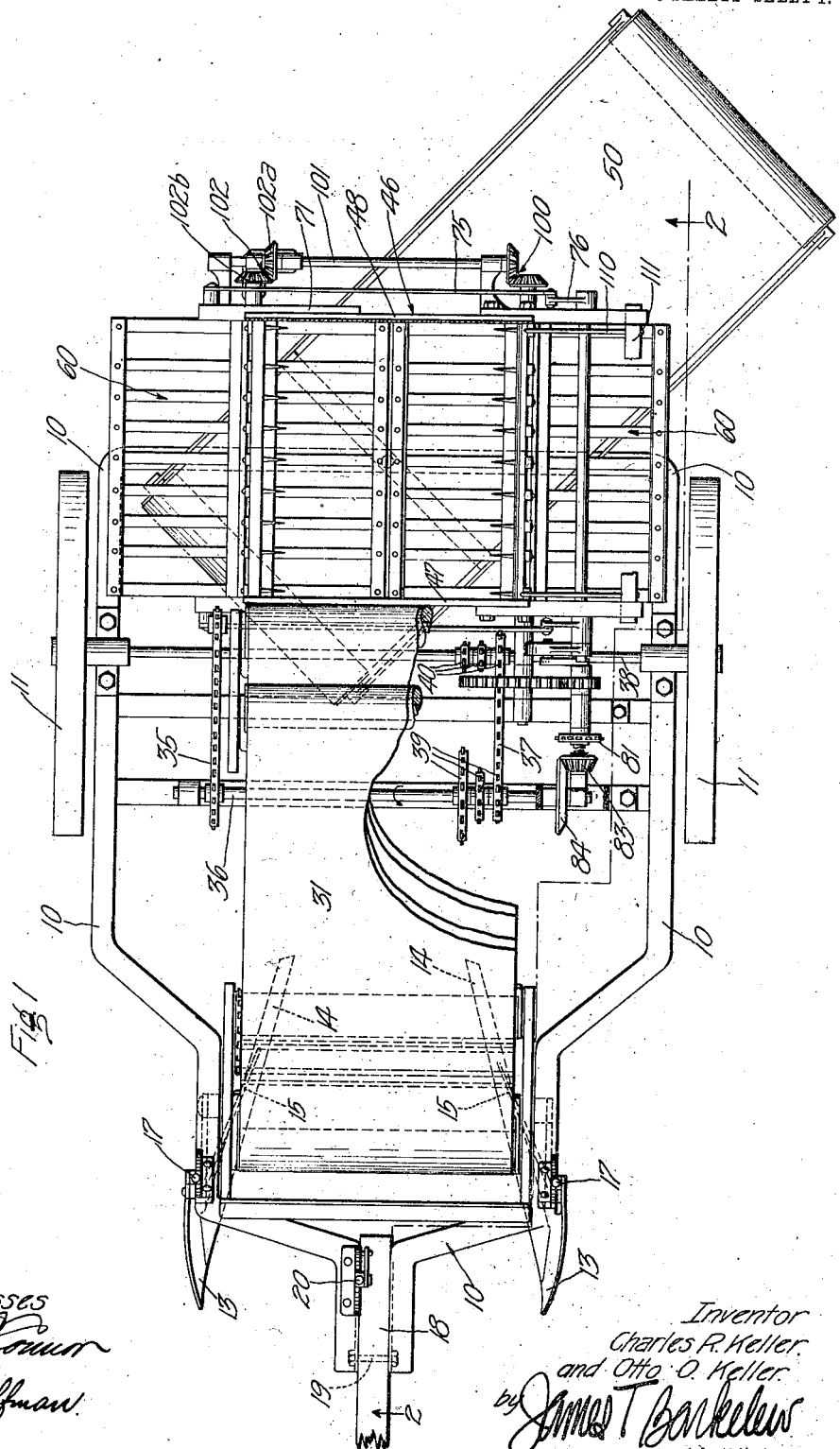

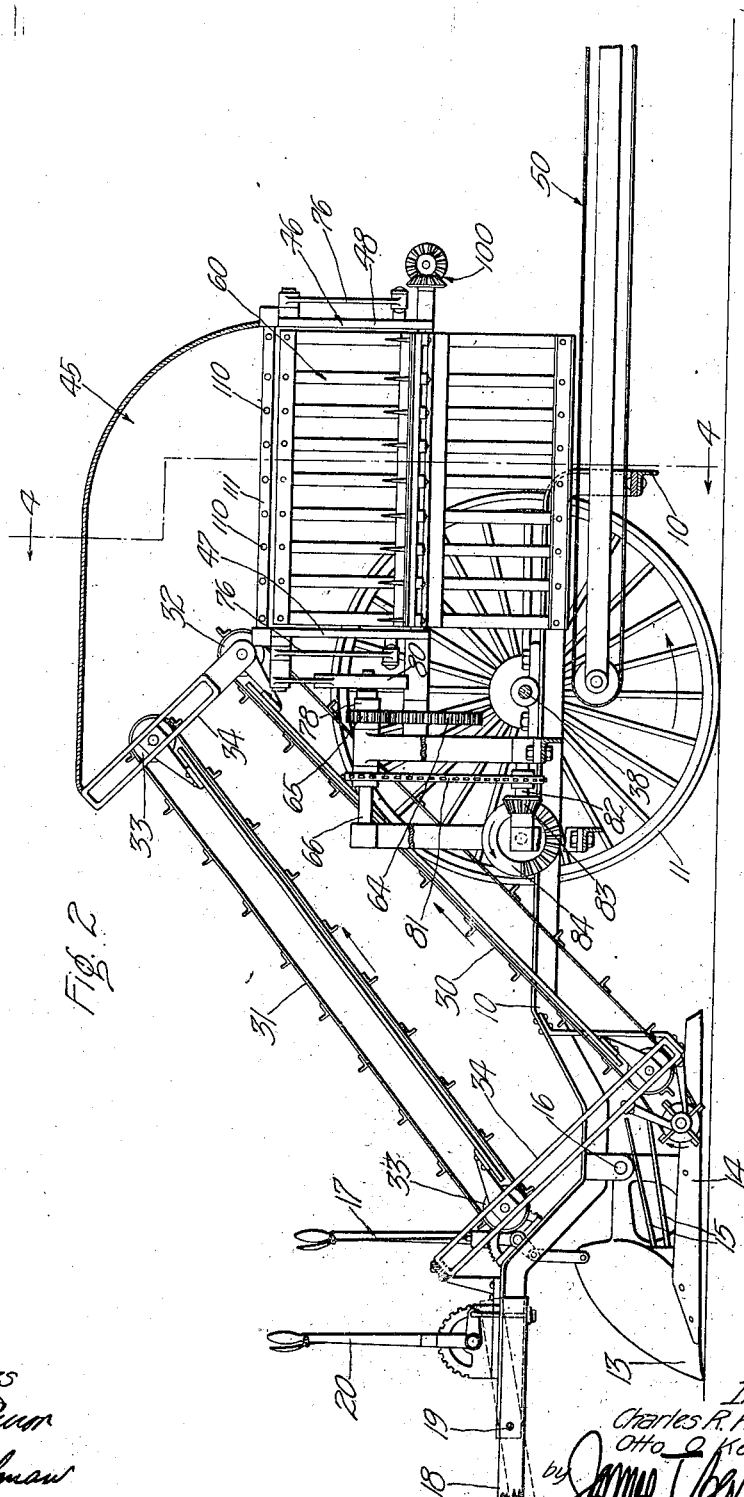

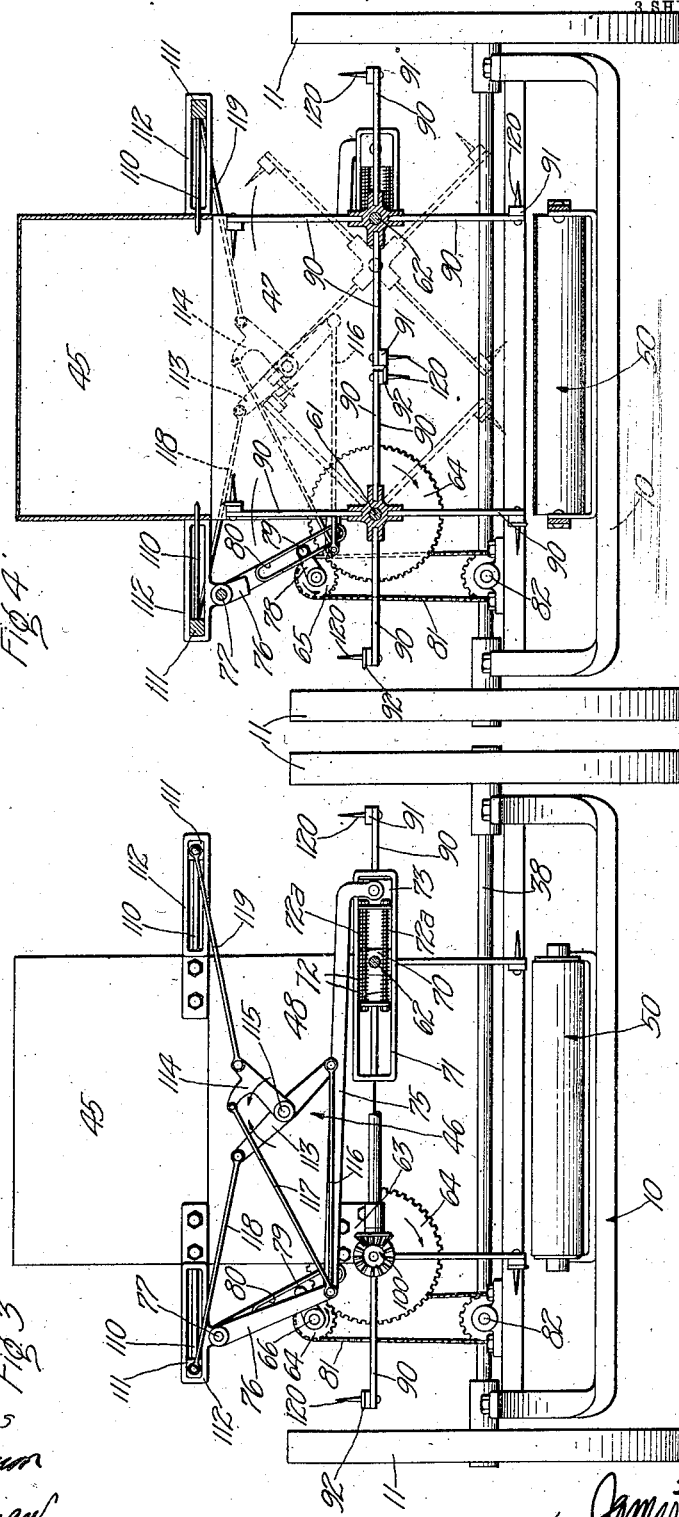

CHARLES R. KELLER, OF OXNARD, AND OTTO O. KELLER, OF SANTA PAULA, CALIFORNIA.

BEAN-HARVESTER.

1,125,026.   Specification of Letters Patent.   Patented Jan. 12, 1915.

Application filed April 7, 1914. Serial No. 830,133.

*To all whom it may concern:*

Be it known that we, CHARLES R. KELLER and OTTO O. KELLER, citizens of the United States, residing at Oxnard and Santa Paula, respectively, in the county of Ventura, State of California, have invented new and useful Improvements in Bean-Harvesters, of which the following is a specification.

This invention relates to certain improvements in bean harvesters of the general character set forth in our United States Letters Patent Nos. 1,053,298; 1,058,757 and 1,059,301; and the present invention relates to certain particular improvements with a view to simplifying the harvester and to improvements in its efficiency. There are several features of improvement of which we speak in the following specification, but there are two to which we particularly wish to draw attention. One of these features includes the combination of the conveyer means which carries bean vines from the cutter to the bundling box, and the bundler mechanism. The conveyer is arranged so as to compress the vines in a vertical direction; and the mechanism in the bundling box is arranged so as to compress the vines in a horizontal direction. The result of this double compression is to form the vines into a bundle suitable for being left on the field to dry. Another feature of the present invention is the construction and organization of the bundling mechanism itself. We have provided a novel form of bundling mechanism in which the vines are separated into bundles and are given their last compression in a comparatively simple manner, necessitating but simple mechanism.

These features will all be more fully pointed out as will other specific features, reference being had to the preferred forms of device shown in the accompanying drawings, in which, Figure 1 is a horizontal plan section of our improved machine, Fig. 2 is a longitudinal vertical section of the same, by line 2—2 of Fig. 1, Fig. 3 is a rear elevation of the machine, Fig. 4 is a section taken as indicated by line 4—4 of Fig. 2.

In the drawings we have shown a suitable frame 10 mounted upon two wheels 11 instead of four wheels as in our former machine. The frame and machinery carried thereon are more or less evenly balanced upon these two wheels, sufficient over-balance being obtained forwardly to cause the plows 13 to efficiently sink into the soil to remove the bean vines. The plows 13 and the blades 14 and the guide rods 15 are of the usual construction and operate much in the usual manner to remove the beans from the soil and to move them inwardly. The plows and blades are adjustably mounted in somewhat the usual manner, the pivots 16 being placed as low as possible and as directly as possible behind the plow points 13, and levers 17 being provided for adjusting the plows and blades. The whole machine is drawn in the usual manner by horses attached to the tongue 18 pivoted at 19 to the frame 10 and lever 20 is provided which is mounted upon the frame and is connected to the tongue 18 in such manner that the angle of the tongue with the frame can be adjusted. For instance, when the machine is being hauled over the road, or in making turns in the field, the tongue will be thrown downwardly to somewhat the position shown in dotted lines in Fig. 2, having the effect of raising the forward end of the machine and raising the plows and blades 13 and 14 off the ground.

Immediately behind the plows and blades, we place our conveyer belts 30 and 31. These belts travel over rollers 32 and 33 respectively which are mounted upon conveyer frames 34, belt 31 being adjustable to and from the belt 30, and its two ends being individually adjustable so as to adjust the degree of convergence of the belt 31 toward the belt 30. Either one or both of the belts 30 and 31 may be driven. If the lower one alone is driven, as is shown in the drawings, the upper belt will be indirectly driven by the mass of vines between the belts. The drag of the upper belt will, in this case, cause more or less of a rolling action of bunches of vines between the belts; which will more or less consolidate the vines into bundles in addition to giving vertical compression to the mass of vines passing up the conveyer. In the drawings, we have shown a chain connection 35 to the upper roller 32 of the belt 30 from the constantly rotating shaft 36. This shaft is driven by chain connection from the shaft 38 upon which the wheels 11 are mounted. The chain connection 37 includes a plurality of wheels 39 mounted upon the shaft 36 and a corresponding plurality 40 mounted upon the shaft 38. The wheels are of different sizes, so that the chain may be placed upon any set of wheels to vary the relative speeds of the shaft 38 and shaft 36. The bundling mechanism is driven by this shaft 36; and the intervals between successive bundling operations will be controlled by the relative speed at which shaft 36 is driven. When the bean vines are thin in the field, it is only necessary to have the bundling mechanism operate at long intervals; when the vines are thick, it is necessary to have the bundling mechanism operate almost continuously.

The discharge of the conveyer belts is into a hood 45 through which the vines pass into the bundling box 46. This bundling box is formed with stationary front and back walls 47 and 48, its other walls being formed by the paddles of the bundling mechanism which operate in the box. The bundling mechanism performs the general function described in our former patents, referred to, comprising rotatable members which separate the vines into individual bundles and discharge them to a conveyer 50 below the bundling mechanism. The conveyer 50 is of the general character described in our Patent No. 1,058,757 and needs no specific description herein. It is the bundling mechanism itself which we particularly wish to describe in this application.

We provide two similar bundling members 60 mounted upon shafts 61 and 62 in the normal relative positions shown in the drawing, the shaft 61 being mounted in stationary bearings 63; and this shaft 61 is rotated by one-to-four gears 64 and 65 from the intermittently rotating shaft 66, the bundler means rotating in the direction indicated. The other bundler member 60 with its shaft 62 is mounted in bearing blocks 70 which slide in horizontal ways 71 mounted upon the bundling box. These sliding bearing blocks 70 are connected by rod 72ª and compression springs 72 with sliding blocks 73 also mounted in the ways 71; and the blocks 73 are moved back and forth along the ways by the action of links 75 connected with arms 76 mounted upon oscillating shaft 77. This oscillating shaft 77 is driven by a crank 78 mounted upon the intermittently rotating shaft 66, the crank pin 79 engaging in a slotted arm 80 mounted upon the oscillating shaft 77. The normal position of the crank shaft is shown in Fig. 4, corresponding to the normal position of the shaft 62 and the right hand bundler member 60 in Fig. 4. The mechanism is such that the parts are always left stationarily in the positions shown, after each bundling operation is completed. The shaft 66 is driven intermittently from the intermittently revolving shaft 82 through the medium of a chain gearing 81; and the intermittent driving of the shaft 66 is such that it is normally left in stationary position as shown in Fig. 4. The shaft 82 has a beveled gear 83 which meshes with a half blank gear 84 of twice the diameter of the gear 83. The gear 84 is mounted directly on the constantly rotating shaft 36 which is driven at a variable speed from the shaft 38. The shaft 36 rotates in the direction indicated and the half-blank gear 84 will intermittently drive the gear 83 through a whole revolution for each alternate half revolution of the gear 84, the other half revolution of the gear 84 leaving the gear 83 stationary. The gear arrangements are such, that when the blank part of the gear 84 comes to the gear 83, the various parts are left in the positions shown. The shafts 82 and 66 make a full revolution upon each operation, the crank 78 making a full revolution and throwing the shaft 62 of the right hand bundler member 60 (in Figs. 3 and 4) to the left and back again, while the bundler members are rotating one quarter of a revolution. The gearing 65 and 64 between the shafts 66 and 61 are arranged in a one-to-four ratio so that the shaft 61 will rotate a quarter revolution while the shaft 66 is rotating a whole revolution. (It will be understood that this specific ratio of one-to-four is in accordance with the provision of four paddles on each of the bundling members, each bundling member turning through a quarter-revolution from one position to the next. But the number of paddles is not restricted to four, although this number is preferred.) In the normal stationary positions of the bundling members 60 the four paddle elements 90 are in the positions shown. These paddle elements may be made up of spaced slats as is shown in Figs. 1 and 2, or in any other suitable manner. The paddles of the right hand bundler member may carry cutting blocks 91 while the paddles of the left hand member may carry cutting knives 92 adapted to engage with the cutting blocks as is shown in Fig. 4. The right hand bundler member is driven by connection with the left hand bundler member, as will be hereinafter described, in the direction indicated; and, during the rotation of the two members through a quarter-revolution, the shaft 62 of the right hand bundler member is moved toward the shaft 61 of the left hand bundler member and back again; so that, instead of the opposing ends of the paddles 90 of the members swinging downwardly and away from each other, the cutting blocks 90 of the right hand bundler move downwardly with the knives 92 of the left hand member, while the shaft 62 moves toward the left; so that, when the movement is half finished, the parts are in the position indicated in dotted lines in Fig. 4, inclosing a square space one-half the size of the space inclosed between the paddles of the two members when they are in the normal position shown in full lines in Fig. 4. The springs 72 take care of any enforced difference between the movements of the slider blocks 73 and of the bearing blocks 70, and put a spring pressure on the cutting knives and blocks. The shaft 62 is driven from the shaft 61 through the medium of beveled gearing 100, a cross shaft 101, and beveled gearing 102, the gear 102$^a$ of which is slidable upon the shaft 101 so as to always mesh with the gear 102$^b$ which is mounted upon the shaft 62.

At the bottom of the hood 45, directly above the upper open end of the bundling box, we provide transversely movable prongs 110 mounted in two sets on frames 111 sliding in ways 112. Movement of the prongs toward each other and back, over the bundling box, is accomplished by the mechanism shown in Fig. 3. Levers 113 and 114 are pivoted at 115 and are connected by rods 116 and 117 to the oscillating arm 76 in such manner that when the arm moves to the left and back the levers 113 and 114 will move in the directions indicated and back. Connecting rods 118 and 119 connect the levers 113 and 114, respectively, with the slider frames 111.

As the vines are forced into the bundling box, they are forced or dropped onto the then horizontal paddles 90 of the bundling mechanisms, between the then upright paddles; the horizontal paddles forming the bottom of the box, and the upright paddles forming the sides of the box. After an interval which is determined by the speed at which the shaft 36 is driven from the shaft 38, the horizontal prongs 110 move into and across the lower end of the hood 45, directly above the bundling box, and the bundler devices begin to turn in the directions indicated and the right hand bundler begins to move inwardly toward the left hand bundler. The cutting blocks 91 may be provided with suitable prongs 120; and the vines which are caught between the prongs 110 and 120 are pulled apart and the mass of vines is thinned out, so that the knife 92 will not have to cut a thick mass of vines when it comes into contact with the cutting block 91. The knife 92 comes into contact with the cutting block 91 when the parts reach the positions shown in dotted lines in Fig. 4; and from the dotted position to the full line position, the knife is in action against the cutting block to sever the stems of the vines and to sever the bundle being made from the next succeeding vine. The bundle of vines is compressed in the reduced space between the four paddles of the bundler 60; and, as the bundlers move farther around, the space between their paddles opens out below and allows the bundle to drop onto the conveyer 50. As soon as the bundlers reach the position shown in dotted lines, the feed of vines begins above the set of paddles which had previously formed the sides of the box and which are about to form the bottom of the bundling box; and the operation is repeated.

We wish to call particular attention to the organization of the machine including the bundling mechanisms as described, including the double rotatable bundlers and the action to move them to separate and compress a bundle of vines.

We claim—

1. In combination, means to compress vines in one direction, and means to separate the vines into bundles and to compress the bundles in a direction transverse to the direction of first compression.

2. In combination, a conveyer means having opposing belts converging toward each other so as to compress vines vertically, and means to separate the vines into bundles and to compress the individual bundles in a horizontal direction.

3. In combination, a conveyer means having opposing converging belts one above the other, a bundling box at the discharge of the conveyer, and means in the box for forming the vines into separate bundles and for compressing the separate bundles in a horizontal direction.

4. Vine bundling means, comprising a box, a pair of revolving bundler members in the box, each member comprising radiating paddles, means to rotate the members so that their paddles move downwardly and inwardly toward each other, and means coöperating with said bundler members to cause the compression of vines held between the paddles of said members.

5. Vine bundling means, comprising a box, a pair of revolving bundler members in the box, each member comprising radiating paddles, means to rotate the members so that their paddles move downwardly and inwardly toward each other, and means to move said members toward each other during their rotation.

6. Vine bundling means, comprising a box, a pair of revolving bundler members in the box, each member comprising radiating paddles, means to rotate the members so that their paddles move downwardly and inwardly toward each other, vine cutting members on the outer edges of the paddles, and means to move said members toward each other during their rotation.

7. Vine bundling means, comprising a frame, a pair of revoluble bundler members mounted on substantially parallel axes on the frame, each member comprising radiating paddles, means to rotate said members so that their paddles move downwardly and inwardly toward each other, and means coöperating with said members to cause compression of vines held between their paddles during the rotation of said members.

8. Vine bundling means, comprising a box, a pair of revolving bundler members in the box mounted on axes substantially parallel to each other, each member comprising a hub and evenly spaced radiating paddles, means to rotate the paddles intermittently through arcs equal to the spacing of the paddles, and means to move the members toward each other during their rotation.

9. Vine bundling means, comprising a box, a pair of revolving bundler members in the box mounted on axes substantially parallel to each other, each member comprising a hub and evenly spaced radiating paddles, vine cutting means on the outer edges of the paddles, means to rotate the paddles intermittently through arcs equal to the spacing of the paddles, and means to move the members toward each other during their rotation.

10. Vine bundling means, comprising a box, a pair of horizontal shafts in bearings at opposite lower edges of the box, one of said shafts being fixed and the other movable in the horizontal plane of the two shafts, bundling members one on each shaft comprising four radial paddles spaced at right angles from each other, means to intermittently rotate both shafts through a right angle, and means to move the movable shaft toward the fixed shaft during the rotation of the members.

11. Vine bundling means, comprising a box, a pair of parallel horizontal shafts in bearings therein at opposite lower edges of the box, one of the shafts being fixed and the other movable to and from the fixed shaft, bundling members one on each shaft comprising four radial paddles spaced at right angles from each other, vine cutting means on the outer edges of the paddles, means to intermittently rotate said members each through a right angle so that their paddles move inwardly and downwardly toward each other, and means to move the movable shaft toward and away from the fixed shaft so that the cutting means at the edge of paddles of the two members are kept in engagement during said rotation.

In witness that we claim the foregoing we have hereunto subscribed our names this 24th day of March, 1914.

CHARLES R. KELLER.
OTTO O. KELLER.

Witnesses:
I. G. FURMAN,
W. C. BUSH.